US011975905B2

(12) United States Patent
Albaum

(10) Patent No.: US 11,975,905 B2
(45) Date of Patent: May 7, 2024

(54) MULTI-LAYER BOTTLE

(71) Applicant: PepsiCo, Inc., Purchase, NY (US)

(72) Inventor: Gary Joseph Albaum, Pleasantville, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/522,173

(22) Filed: Jul. 25, 2019

(65) Prior Publication Data

US 2020/0031552 A1 Jan. 30, 2020

Related U.S. Application Data

(60) Provisional application No. 62/712,042, filed on Jul. 30, 2018.

(51) Int. Cl.

| | |
|---|---|
| ***B65D 1/00*** | (2006.01) |
| ***B65D 1/02*** | (2006.01) |
| ***B65D 1/40*** | (2006.01) |
| ***B65D 79/00*** | (2006.01) |
| ***B65D 85/00*** | (2006.01) |
| ***B65D 85/72*** | (2006.01) |
| ***B67C 7/00*** | (2006.01) |

(52) U.S. Cl.

CPC ....... *B65D 79/0084* (2020.05); *B65D 1/0215* (2013.01); *B65D 1/40* (2013.01); *B65D 85/72* (2013.01); *B67C 7/00* (2013.01)

(58) Field of Classification Search

CPC ...... B65D 1/0215; B65D 1/40; B65D 79/005; B65D 85/72; B65D 79/008; B65D 79/0081; B65D 90/022; B65D 79/0084; B67C 7/00

See application file for complete search history.

(56) References Cited

U.S. PATENT DOCUMENTS

| | | | | |
|---|---|---|---|---|
| 3,769,056 A * | 10/1973 | Sincock | .................. B29C 44/56 427/259 |
| 4,466,553 A | 8/1984 | Zenger | |
| 4,653,661 A | 3/1987 | Buchner et al. | |
| 5,301,838 A | 4/1994 | Schmidt et al. | |
| 5,407,629 A | 4/1995 | Schmidt et al. | |
| 6,095,360 A | 8/2000 | Shmagin et al. | |

(Continued)

OTHER PUBLICATIONS

Bias, v. meanings, etymology and more—Oxford English Dictionary.*

(Continued)

*Primary Examiner* — Ericson M Lachica
(74) *Attorney, Agent, or Firm* — Sterne, Kessler, Goldstein & Fox P.L.L.C.

(57) ABSTRACT

A multi-layer beverage container made is disclosed. An outer layer encloses an inner layer that is configured to shrink or flex to accommodate volume changes of a beverage inside the beverage container caused by a change in temperature of the beverage in the sealed beverage container. The inner layer is not attached to the outer layer through the majority of the beverage container, with attachment zones being located at selected areas of the outer layer. There is a space between the inner layer and the outer layer. A gas introduction system is provided in the space to maintain a desired gas pressure in the space. The set gas pressure allows outer layer to be designed without the need to resist deformation caused by reduced pressure due to changing volumes of the beverage.

19 Claims, 10 Drawing Sheets

(56) References Cited

U.S. PATENT DOCUMENTS

| | | | | |
|---|---|---|---|---|
| 7,482,047 | B1 * | 1/2009 | Tremley | B32B 27/32 428/35.7 |
| 8,453,860 | B2 | 6/2013 | Otero | |
| 8,931,651 | B2 | 1/2015 | Van Hove et al. | |
| 2004/0000126 | A1 * | 1/2004 | Schmidt | B67C 3/12 53/431 |
| 2005/0248059 | A1 * | 11/2005 | Uesugi | B29C 71/0063 264/322 |
| 2009/0095702 | A1 * | 4/2009 | Ungrady | B65D 1/0284 215/383 |
| 2010/0314281 | A1 * | 12/2010 | Toyoda | B32B 27/306 206/524.6 |
| 2012/0074151 | A1 * | 3/2012 | Gill | B65D 1/0223 220/669 |
| 2013/0004692 | A1 * | 1/2013 | Hutts | B65D 35/08 428/36.92 |
| 2013/0062302 | A1 * | 3/2013 | Otero | B65D 23/001 215/12.1 |
| 2020/0024021 | A1 * | 1/2020 | Agerton | B32B 27/365 |

OTHER PUBLICATIONS

Bias, n., adj., & adv. meanings, etymology and more—Oxford English Dictionary.*

International Search Report and Written Opinion issued in International Application No. PCT/US19/43915, dated Dec. 2, 2019, 16 pages.

* cited by examiner

MULTI-LAYER BOTTLE

CROSS-REFERENCE TO RELATED APPLICATION

This application claims the benefit of U.S. Provisional Patent Application No. 62/712,042 filed on Jul. 30, 2018, which is incorporated herein in its entirety by reference thereto.

FIELD

The described embodiments generally relate to beverage containers that are constructed from multiple layers of material.

BRIEF SUMMARY

An example embodiment is a bottle with a neck and a base that includes an outer layer made from plastic. An inner layer is located inside the outer layer and contacts the outer layer at the neck. The inner layer is made from a plastic material that shrinks or flexes to accommodate a change in its interior volume due to, for example, a beverage cooling within the interior volume. The inner layer may separate or otherwise move away from the outer wall to accommodate the change in volume. For example, there may be a space between the outer shell and the inner layer. A gas, such as air, may occupy the space between the outer layer and the inner layer. The gas may be drawn from the atmosphere around the bottle, or may be generated between the outer layer and the inner layer by, for example, a gas-introduction system in fluid connection with the space between the outer layer and the inner layer.

BRIEF DESCRIPTION OF THE FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

Figure 1:
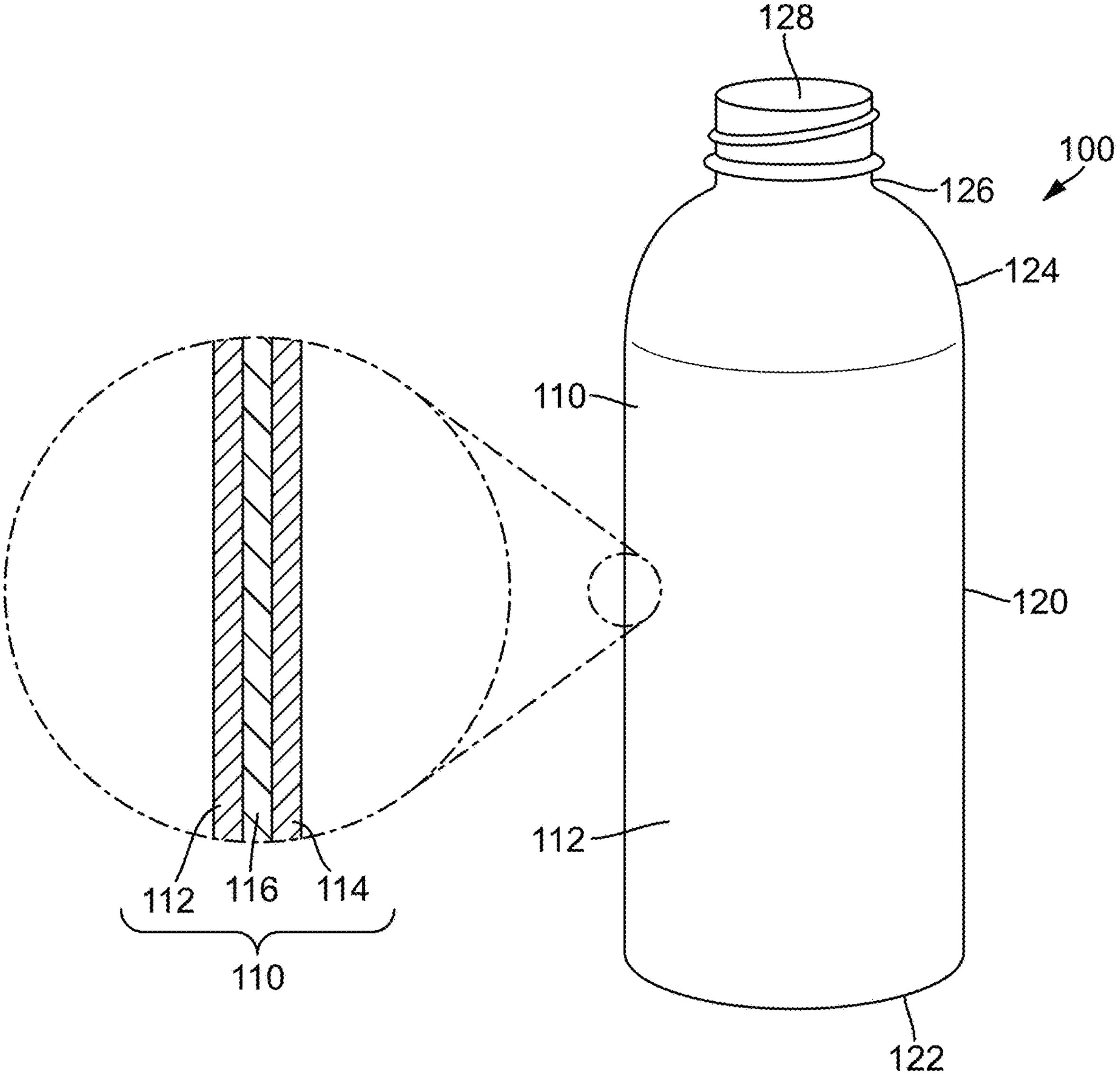
FIG. 1 is a front view of a beverage container according to an embodiment.

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Plastic beverage containers, such as bottles, made from materials such as Polyethylene terephthalate ("PET") are widely used in the beverage industry to package beverages. PET bottles are a low-cost and lightweight alternative to bottles made from other plastic materials and materials such as glass or aluminum. Many beverages are filled into bottles at an elevated temperature. This practice, commonly known as "hot fill," is used to prevent contamination of beverages. This allows the beverage to be filled into a bottle without the need for additional sterilization. After the bottle is filled and capped, the beverage is allowed to cool from the elevated filling temperature. As the beverage cools it—along with correspondingly cooling air within the bottle—undergoes thermal contraction in volume.

Because the bottle is sealed while it cools, in order to accommodate this contraction of volume the walls of the bottle may deform so that the volume of the interior of the bottle reduces along with the reduction in volume of its contents.

Some bottles may be designed to resist such deformation, for example by including ribs or thick walls. However this can require substantial additional material and added cost, and may result in a significant negative pressure within the bottle. Some bottles may be designed with movable walls and panels that are designed to flex inwardly to accommodate the interior reduction in volume attendant to thermal contraction of the bottle contents. However this can require unwanted interruptions and irregular surfaces in the visual and tactile aspects of the bottle. Such surface structures can also make a bottle hard or awkward for a user to squeeze, which some users may want to do to facilitate drinking from the bottle (e.g., through a reclosable spout).

Embodiments described herein, however, accommodate a hot-filled bottle's interior reduction in volume attendant to thermal contraction of the bottle contents without resisting the change in volume. The resulting bottle does not require exterior movable walls and panels, and does not change exterior shape due to the thermal contraction of the beverage. For example, a bottle can include a multi-layer wall construction, where the plastic inner layer of the bottle wall can move independently away from the plastic outer layer of the bottle wall to accommodate a change in internal volume of the bottle. In other words, there may be a space between the outer layer and the inner layer. And although the inner layer deforms, by shrinking or flexing, and pulls away from the outer layer so that the internal volume of the bottle changes, the outer layer maintains its shape. Therefore the outer shape of the bottle remains constant throughout the thermal contraction of its contents, while the inner layer shrinks or flexes to accommodate the thermal contraction.

Figure 2:
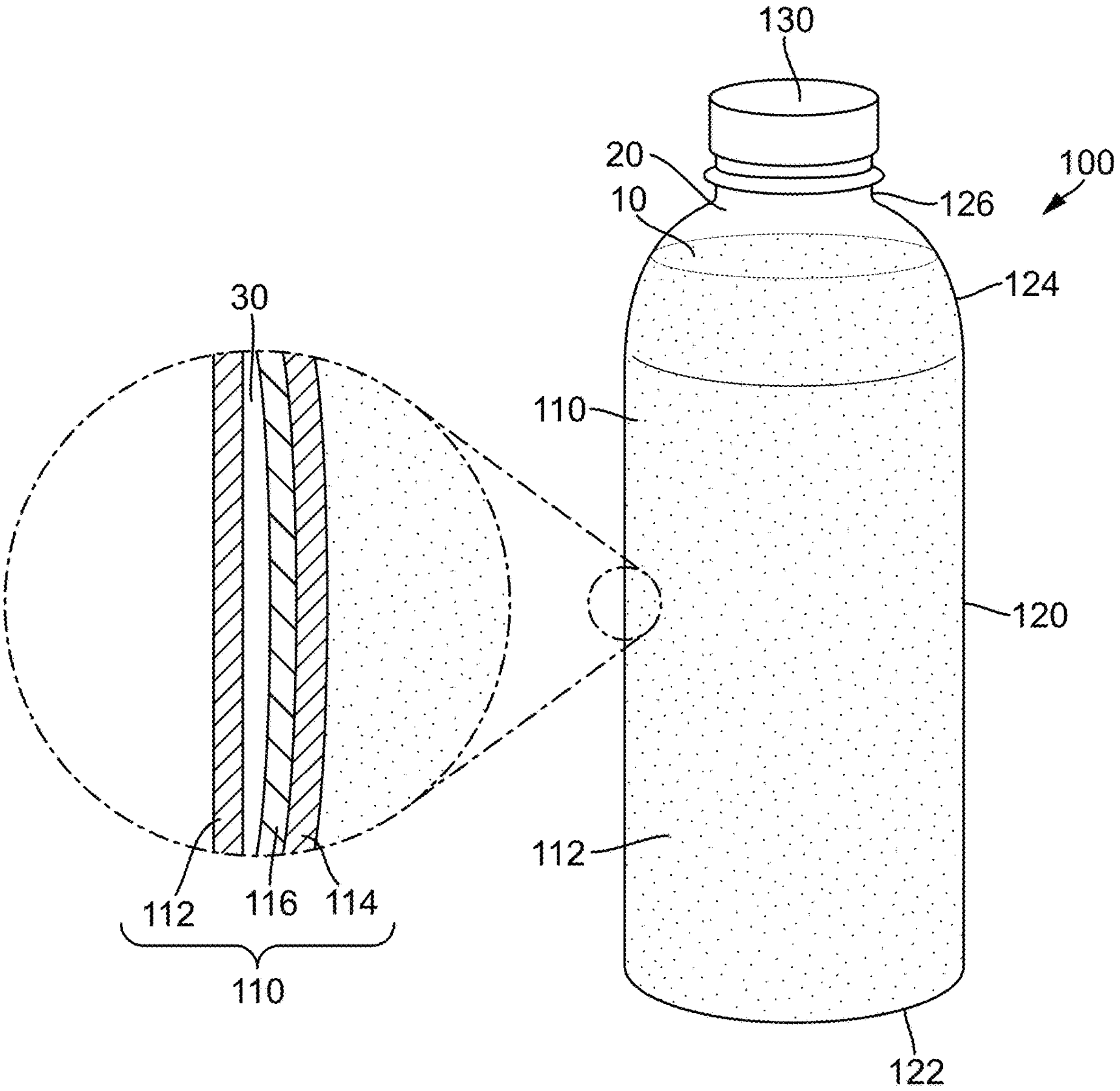
FIG. 2 is a front view of the beverage container of FIG. 1 with a beverage showing a wall structure of the beverage container.

FIGS. 1 and 2 show a beverage container (bottle 100) before filling (FIG. 1) and after a hot-fill filling, capping, and cooling process (FIG. 2). FIGS. 1 and 2 include a cross-sectional representation of a portion of bottle 100's wall 110, which includes outer layer 112 and inner layer 114, and, optionally, a number of interlayers, such as, for example, interlayer 116, which may be, for example, a gas barrier layer or a release layer. As shown in FIGS. 1 and 2, outer layer 112 defines the shape and outward appearance of bottle 100, and may be formed, for example, with a cylindrical body 120, a circular base 122, and a tapered shoulder 124, and neck 126 that defines an opening 128. Thus, outer layer 112 may be generally cylindrical in shape. Layers 112 and 114 of wall 110 may be constructed, for example, of PET plastic, although other types of plastics and additives, such as coloring tints and the like, may also be included as part of the material of layers 112 and 114.

As shown in FIG. 1, before bottle 100 is filled, inner layer 114, outer layer 112, and interlayer 116 are layered together, and inner layer 114 is biased towards outer layer 112 and follows the shape of outer layer 112. Inner layer 114 is located inside outer layer 112. As shown in FIG. 2, after bottle 100 is filled with a hot beverage 10, opening 128 is capped with cap 130. As beverage 10 cools, it undergoes thermal contraction. Due to cap 130, no new matter may be introduced into an interior volume 20 of inner layer 114, and thus interior volume 20 contracts along with beverage 10. In doing so, inner layer 114 pulls away from outer layer 112, creating a space 30 between inner layer 114 and outer layer 112 while inner layer 114 remains sealed. In some embodiments, as shown, interlayer 116 stays connected to inner layer 114, such that space 30 is formed directly between interlayer 116 and outer layer 112. In other embodiments, interlayer 116 may stay connected to outer layer 114, such that space 30 is formed directly between interlayer 116 and inner layer 114. In some embodiments, interlayer 116 may only be present in some portions of the bottle, but not in others, in order to aid in structural stability. In other embodiments, interlayer 116 may be absent, and space 30 is formed directly between inner layer 114 and outer layer 112.

Because inner layer 114 separates and moves away from outer layer 112 and shrinks, flexes, or otherwise deforms to accommodate thermal contraction of beverage 10, outer layer 112 does not appreciably deform or otherwise change shape due to the thermal contraction of beverage 10, and therefore bottle 100 maintains its original exterior appearance. All of the volume reduction within bottle 100 due to thermal contraction of beverage 10 is accommodated by inner layer 114. In an embodiment, inner layer 114 remains attached to outer layer 112 at neck 126 (e.g., via interlayer 116), even after thermal contraction of beverage 10. In some embodiments, inner layer 114 remains attached to outer layer 112 at base 122 (e.g., via interlayer 116) even after thermal contraction of beverage 10. Such attachment may help to maintain the position of inner layer 114 within outer layer 112 after inner layer 114 moves away from outer layer 112. As discussed in further detail below, in some embodiments, various techniques may be used to ensure that inner layer 114 shrinks or flexes in a controlled manner away from outer layer 112 (e.g., uniformly, or in a controlled pattern), thus keeping deformation of inner layer 114 and correspondence or difference between the shapes of inner layer 114 and outer layer 112 controlled. When bottle 100 is opened for the first time, and the interior of inner layer 114 is exposed to ambient pressure, inner layer 114 will expand in volume and move towards outer layer 112.

Such attachment may be effected by, for example, controlling the thickness of inner layer 114 and outer layer 112 as bottle 100 is formed. For example, forming inner layer 114 thicker at neck 126 and base 122 may give it increased rigidity such that inner layer 114 at neck 126 and base 122 is less apt to deform, and thus less apt to separate from outer layer 112 at those positions when undergoing thermal contraction. In this case, all thermal contraction of beverage 10 will be accommodated by portions of inner layer 114 between neck 126 and base 122. In some embodiments inner layer 114 remains attached to outer layer 112 at neck 126, and not at base 122, or at base 122 and not at neck 126, or at both neck 126 and base 122. Space 30 is the space between outer layer 112 and inner layer 114. Space 30 may be distributed evenly between outer layer 112 and inner layer 114. However, in some embodiments and circumstances, space 30 may not necessarily be distributed evenly between outer layer 112 and inner layer 114. For example, if bottle 100 is upright, space 30 may be relatively even around body 120, but if bottle 100 is on its side, space may be concentrated upward, since the weight of beverage 10 may put inner layer 114 closer to outer layer 112 on the downward side of bottle 100. Space 30 may be filled with a gas. In some embodiments, this gas may be ordinary air, which is a blend of oxygen, nitrogen, and trace gases. In other embodiments, space 30 may be filled with other gases or gas mixtures, such as nitrogen gas, argon gas, carbon dioxide gas, or any other suitable gas or gas mixture.

In a three-layer wall as shown, for example, in FIGS. 1 and 2, space 30 may be formed between any two of layers 112, 114, and 116 to accommodate decrease in interior volume 20 due to thermal contraction without distorting outer layer 112, and thus without distorting the overall shape of bottle 100. For example, in some embodiments inner layer 112 may separate from interlayer 116, while interlayer 116 remains attached to outer layer 114 such that only inner layer 114 deforms. In some embodiments interlayer 116 may separate from outer layer 112, while interlayer 116 remains attached to inner layer 114, such that both interlayer 116 and inner layer 114 deform. Wall 110 is shown and described with three layers for ease of description, however the principles described herein can apply to bottle walls having any number of layers.

Some benefits of the above-described bottle 100 are that bottle 100 can be designed with relatively thin walls that do not include any ribs or panels in outer layer 112 to resist or accommodate deformation caused by volume and/or pressure reduction within bottle 100 due to thermal contraction of beverage 10. Another benefit of these embodiments is that space 30 may provide insulating properties to beverage container 1. Heat transfer may be reduced across space 30, and thus a chilled beverage 10 in bottle 100 will reach equilibrium with the outside temperature at a slower rate. Another benefit of the above embodiments is that resulting bottle 100 is “squeezable” by a consumer, and the aesthetics and feeling of bottle 100 in the hand of a consumer during squeezing is improved when compared to those of ordinary plastic bottles that may be squeezed. This is because the same ribs, panels, and other structure that are used to inhibit or control deformation in some plastic hot-fill bottles also tend to resist deformation from squeezing, making a bottle hard and awkward for a user to squeeze, often result in in a cracking or crinkling sound and feeling during squeezing.

Embodiments of bottle 100 as described here have a smooth exterior and will have minimal or no cracking and crinkling and lower resistance to squeezing.

As discussed above, delamination between two of outer layer 112, inner layer 114, and interlayer 116 occurs when inner layer 114 deforms to accommodate the contraction of cooling beverage 10 in sealed bottle 100. Controlling the delamination can be accomplished in a variety of ways. For example, in an embodiment one or more of interlayers 116 may be a release material that weakens attachment of inner layer 114 to outer layer 112, thereby promoting release, or delamination, of inner layer 114 from outer layer 112 as described above. Release material interlayer 116 may be co-injected between outer layer 112 and inner layer 114 (e.g., when the preform of bottle 100 is being created). Selective injection of the release material can be used to control the position of delamination of inner layer 114 from outer layer 112. For example, release material interlayer 116 may be confined to cylindrical body 120, which would result in delamination being concentrated in that section of bottle 100.

Alternatively or additionally, to promote delamination, two or more of outer layer 112, inner layer 114, and interlayer 116 may be formed from materials that do not form a strong bond with each other. The weakness of the bonds between such incompatible materials promotes delamination when beverage 10 cools and contracts as described above. The placement of the incompatible materials in bottle 100 can be varied to promote or inhibit delamination in various sections of bottle 100. Further the thicknesses of outer layer 112, inner layer 114 and interlayer 116 throughout the body may be varied to promote or inhibit delamination at various positions. As discussed above, thicker layers resist the inward forces caused by the pressure differential between the inside of bottle 100 and the ambient atmospheric pressure. Thus, thicker portions of the walls of bottle 100 deform less and are more resistant to delamination. Thinner portions of the layers, by contrast, may tend to delaminate easier than thicker portions. So by forming, for example, inner layer 114 thinner in cylindrical body 120 than in shoulder 124, inner layer 114 may delaminate from outer layer 112 (with or without interlayer 116) in cylindrical body 120 and not in shoulder 124 of bottle 100

Figure 3:
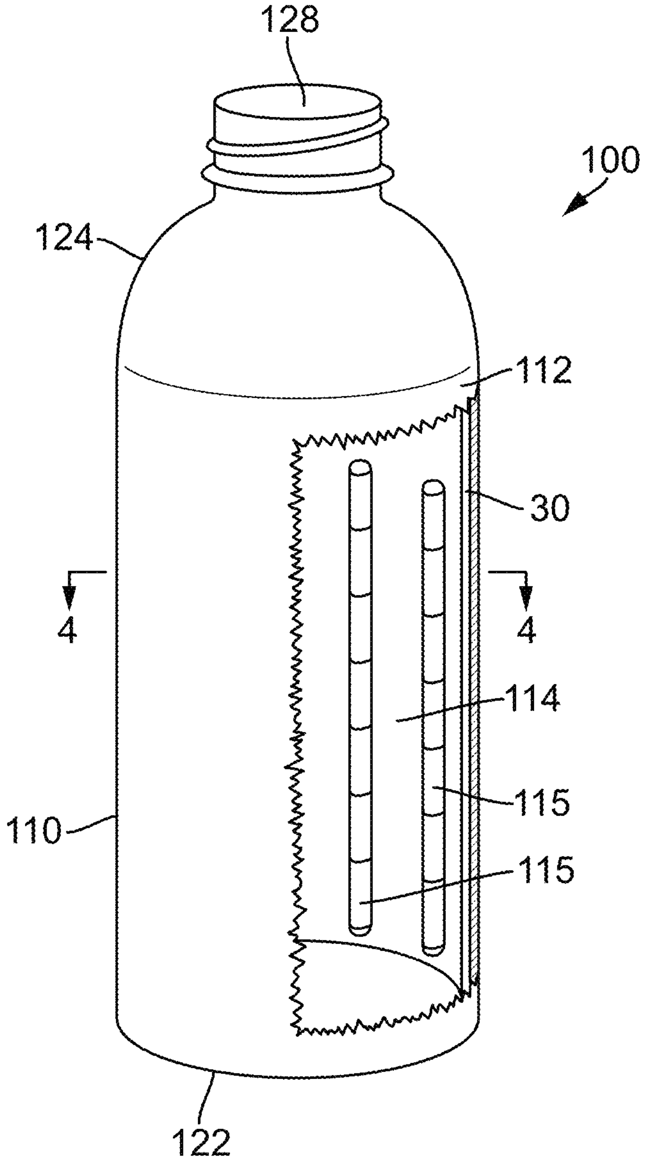
FIG. 3 is a cut-away view of the beverage container of FIG. 1.
Figure 4:
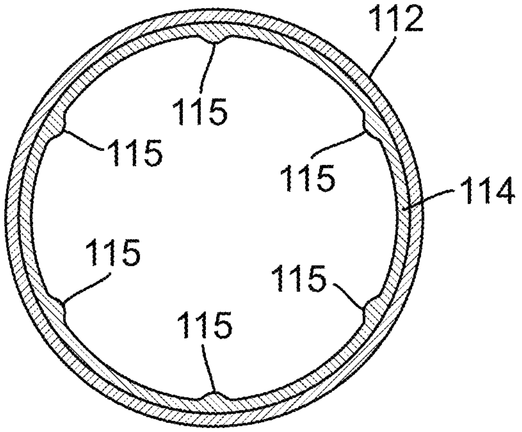
FIG. 4 is a cross-sectional view of the beverage container of FIG. 1 taken along line 4-4 of FIG. 3, showing a pre-fill configuration.
Figure 5:
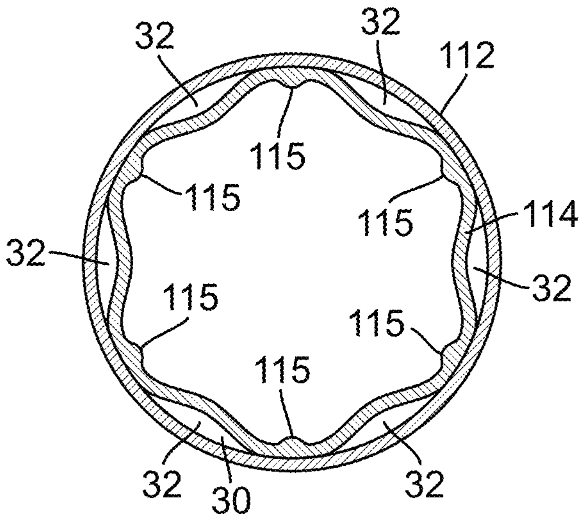
FIG. 5 is a cross-sectional view of the beverage container of FIG. 1 taken along line 4-4 of FIG. 3, showing a post-fill configuration.

Alternatively or additionally, to control delamination, inner layer 114 may include one or more vertical ribs 115 (e.g., on an inner surface of inner layer 114). As shown in FIG. 3 vertical ribs 115 may be vertically oriented (e.g., aligned in the direction of a longitudinal axis of bottle 100). FIGS. 4 and 5 show horizontal cross-sections of bottle 100 with ribs 115, before and after thermal contraction, respectively. Vertical ribs 115 may be disposed on the inner surface of inner layer 114. In embodiments, vertical ribs 115 are thickened sections of inner layer 114. The increased thickness of inner layer 114 at ribs 115 reduces the delamination of inner layer 114 from outer layer 112 at ribs 115 because thicker portions of inner layer 114 (e.g. ribs 115) deform less than the thinner portions of inner layer 114 between ribs. The result is that the areas of delamination between inner layer 114 and outer layer 112 form between ribs 115 and are separated by ribs 115. Thus, ribs 115 act to promote delamination of layer 114 in the areas between ribs 115. These areas of delamination, or rib compartments 32, may be isolated from each other by ribs 115. In this manner, space 30, and thus the volume difference between inner layer 114 and outer layer 112, may be selectively distributed into rib compartments 32. In embodiments, ribs 115 may be evenly spaced around the circumference of inner layer 114 (see FIGS. 4 and 5). The result is an even distribution of space 30 in rib compartments 32 around bottle 100. For example, there may be between four and eight ribs 115 evenly spaced around the circumference of inner layer 114 (e.g., six ribs 115, as shown in FIGS. 4 and 5). In embodiments, ribs 115 may extend between 50% and 90% of the height of inner layer 114.

Vertical ribs 115 may help provide a way to control deformation of inner layer 114. For instance, evenly-spaced ribs around inner layer 114 may help minimize a tendency for delamination of inner layer 114 to concentrate in any one location, by inhibiting the degree of deformation that can occur between adjacent ribs 115.

Any of the techniques described here may be used alone or in combination to control delamination of the layers. For example, inner layer 114 and outer layer 112 may be made from incompatible materials that form a weak bond, and certain portions of bottle 100, for example layers 112, 114, 116 in neck 126 and base 122, may be made thick enough to resist delamination. In this way, delamination can be made to occur only in a desired section of bottle 100, for example, cylindrical body 120. As discussed above, the selective injection of the release material can also be used to control the position of delamination of inner layer 114 from outer layer 112 by effectively weakening the bond between inner layer 114 and outer layer 112 where desired.

Figure 6:
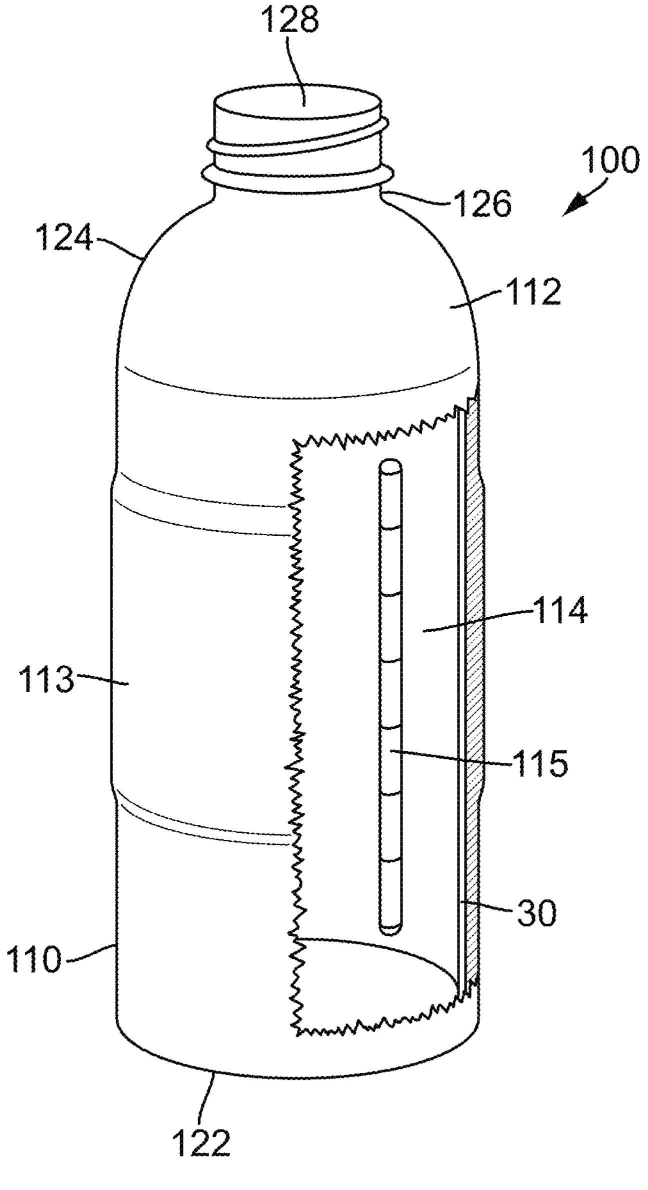
FIG. 6 is a cut-away view of a beverage container according to an embodiment.

In some embodiments, to further help maintain the outer shape of bottle 100, outer layer 112 may include a reinforcing band 113 (see, e.g., FIG. 6). Reinforcing band 113 may be a section of increased wall thickness of outer layer 112. The increased wall thickness may either extend radially outward from the outer surface of outer layer 112 (as shown in FIG. 6), may extend radially inward from the inner surface of outer layer 112, or may partially extend in both directions. In some embodiments a radially-inward reinforcing band 113 may be preferable (e.g., because it results in a smooth outer surface of outer layer 112, and because it may be easier to eject from a mold). As shown in FIG. 6, some embodiments of reinforcing band 113 may extend a constant percentage of the height of bottle 100. For example, reinforcing band 113 may, as shown in FIG. 6, be disposed near or along a midline of bottle 100 and extend above and below the midline of bottle 100. The thickness and dimensions of reinforcing band 113 may be configured to increase rigidity of outer layer 112, and thus may be modified as needed to achieve the desired rigidity. The thickness of reinforcing band 113 may gradually taper, or become thinner, as reinforcing band 113 extends toward neck 126 and base 122. A height of reinforcing band 113 (i.e., a distance between extents of its upper and lower tapers) may be at least 50% of a height of bottle 100. In some embodiments, outer layer 112 may not include any rib features similar to ribs 115 found on inner layer 114 or other panel features that act to reinforce or otherwise alter the cylindrical shape of outer layer 112.

Figure 7:
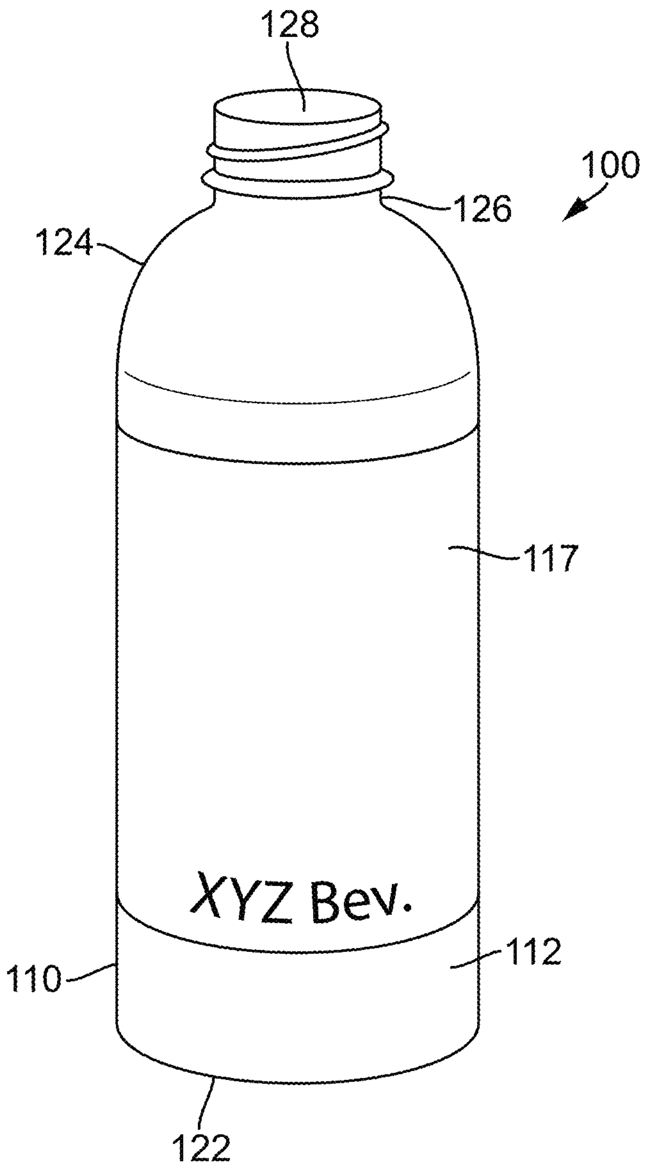
FIG. 7 is a front view of a beverage container according to an embodiment.

In some embodiments, bottle 100 may include a label 117. As shown in FIG. 7, label 117 may include branding or advertising related to the beverage stored in bottle 100. In embodiments, label 117 may be produced and separately and fixed to the exterior surface of bottle 100 through the use of adhesives and/or other suitable methods. In embodiments, the material of label 117 may be configured to provide reinforcement to outer layer 112. For example, label 117 may be produced from a plastic material with a greater rigidity than that of outer layer 112, or from a plastic material that, when in contact with outer layer 112, helps outer layer 112 resist deformation. When these embodiments of label 117 are fixed to outer layer 112, they can provide additional rigidity and reinforcement to outer layer 112.

Figure 8:
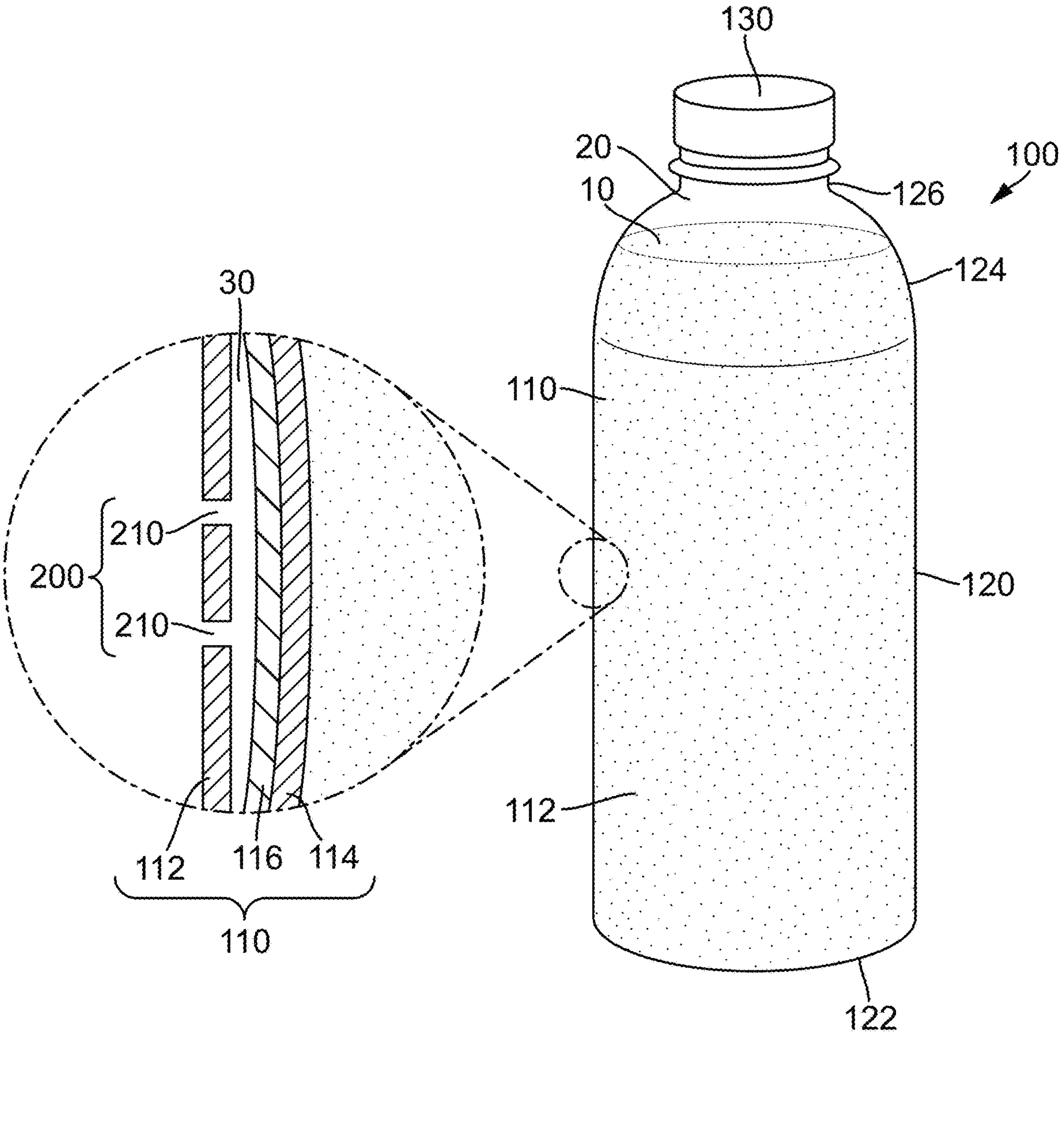
FIG. 8 is a front view of the beverage container of FIG. 1 with a beverage showing an alternative or additional wall structure of the beverage container.
Figure 12:
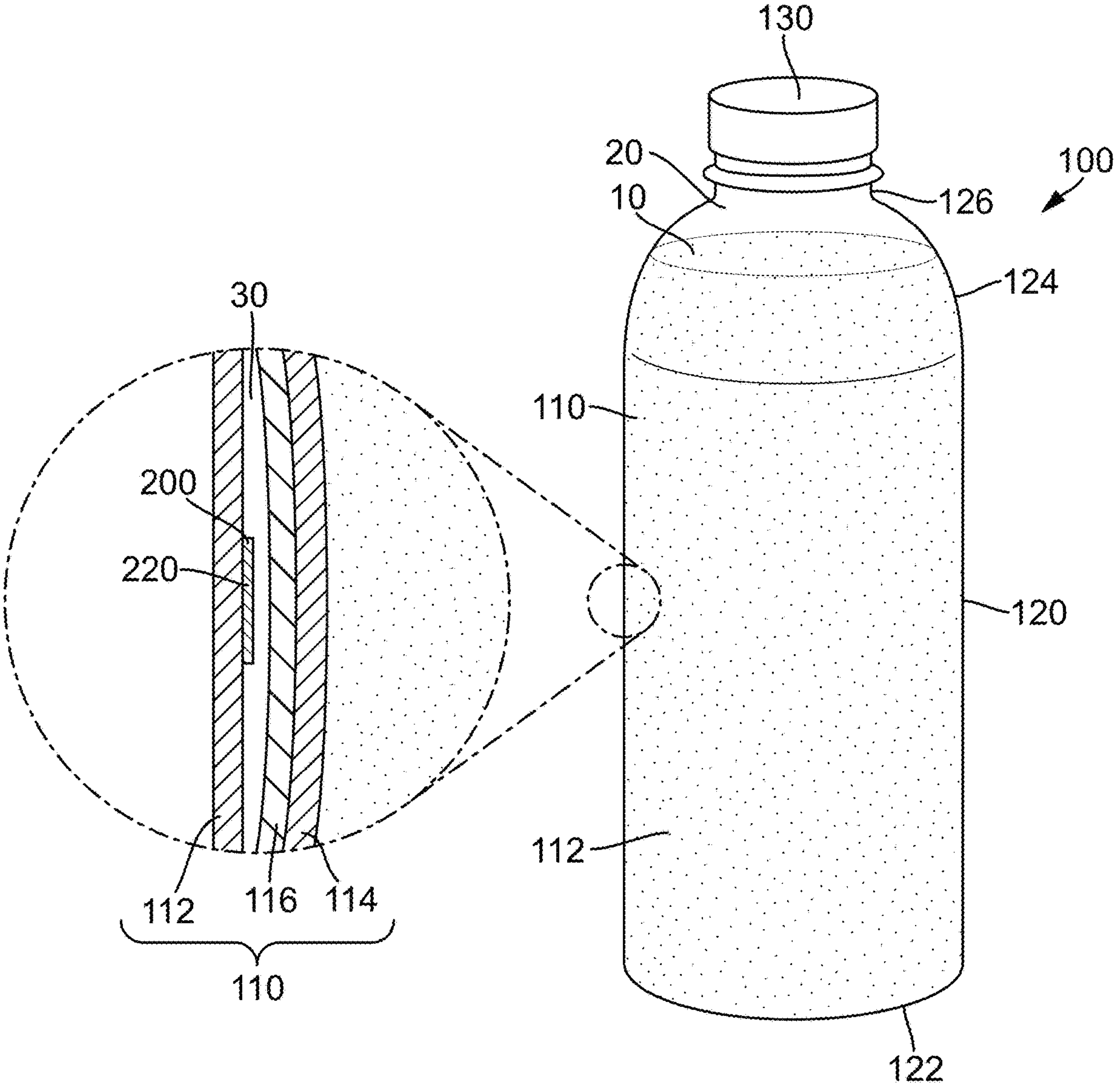
FIG. 12 is a front view of the beverage container of FIG. 1 with a beverage showing an alternative or additional wall structure of the beverage container.

In some embodiments, bottle 100 includes a gas introduction system 200 (see, e.g., FIGS. 8, 12). Gas introduction system 200 is configured to supply additional gas to space 30 as the volume of space 30 increases due to beverage 10 contracting after being filled into bottle 100 at an elevated temperature. The absence of reduced gas pressure in space 30 means that inner layer 114 does not need to overcome vacuum forces to delaminate and deform inwardly as described above. In some embodiments, space 30 may provide stiffening and structural support for outer layer 112 by containing a gas at an elevated pressure. This structural support may create an enhanced hand feel for the end user.

In some embodiments, as shown, for example, in FIG. 8, gas introduction system 200 includes a series of venting openings 210 that penetrate outer layer 112. In these embodiments, the gas in space 30 is ordinary air from the atmosphere outside the bottle. Venting openings 210 allow the air inside space 30 to maintain atmospheric pressure as the volume of space 30 increases. Venting openings 210 may be located anywhere on outer layer 112 that allows a through hole to access space 30. Venting openings 210 may be formed, for example, by precise punctures made by a physical tool (e.g., a lance or a drill) or by a laser, where such punctures only go through outer layer 112, and not inner layer 114. In some embodiments, venting openings 210 are designed and located to reduce their visibility to a user of bottle 100. For example, venting openings 210 may be located on base 122 in such a way as to be obscured from sight when bottle 100 is placed on a horizontal surface, or they may be positioned on body 120 in an area that will be covered by a label.

In some embodiments, inner layer 114 is configured to cover or close venting openings 210 before bottle 100 is filled with a beverage. In these embodiments inner layer 114 may configured to break away from venting openings 210 and thus to allow air to enter space 30 through venting openings 210, thereby equalizing the pressure in space 30 with the ambient pressure. In some embodiments, venting openings 210 may be located in an area of bottle 100 that experiences significant stretch during the molding process, such that the area is relatively thinner than other areas of the bottle. For example, venting openings 210 may be located at an area of outer layer 112 where the material of outer layer 112 has a high total stretch ratio (e.g., at an area of outer layer 112 where the stretch ratio is in the top 10th percentile of the stretch ratios throughout the material of outer layer 112). Upon heating of inner layer 114 (e.g., approaching and, in some cases passing, its glass transition temperature) caused by, for example, the filling of bottle 100 with a hot beverage, the thin layer of material of inner layer 114 covering venting opening 210 may contract and then break open vent 210 (e.g., due at least in part to thermal orientation reversal of the material surrounding venting openings 210 caused by the heating of the material). This controlled breakage may be fine-tuned by selecting the thickness of outer layer 112 and inner layer 114 that surround the venting openings 210.

In some embodiments, alternatively or additionally, a pressure change within interior volume 20 can cause inner layer 114 to move inwardly away from venting openings 210 (e.g., due to a pressure change, for example due to thermal contraction, within interior volume 20) and to thereby break open venting openings 210 (e.g., when a threshold pressure differential between interior volume 20 and the atmosphere outside the bottle is reached). This pressure differential may be caused by the contraction of inner layer 114 after bottle 100 is filled with a hot beverage, or, it may be caused by an external source of vacuum applied to bottle 100 (e.g., before bottle 100 is filled).

In some embodiments, after cooling of beverage 10 is completed, venting openings 210 may be sealed or covered (e.g., by application of a label adhered around venting openings 210.

Figure 9:
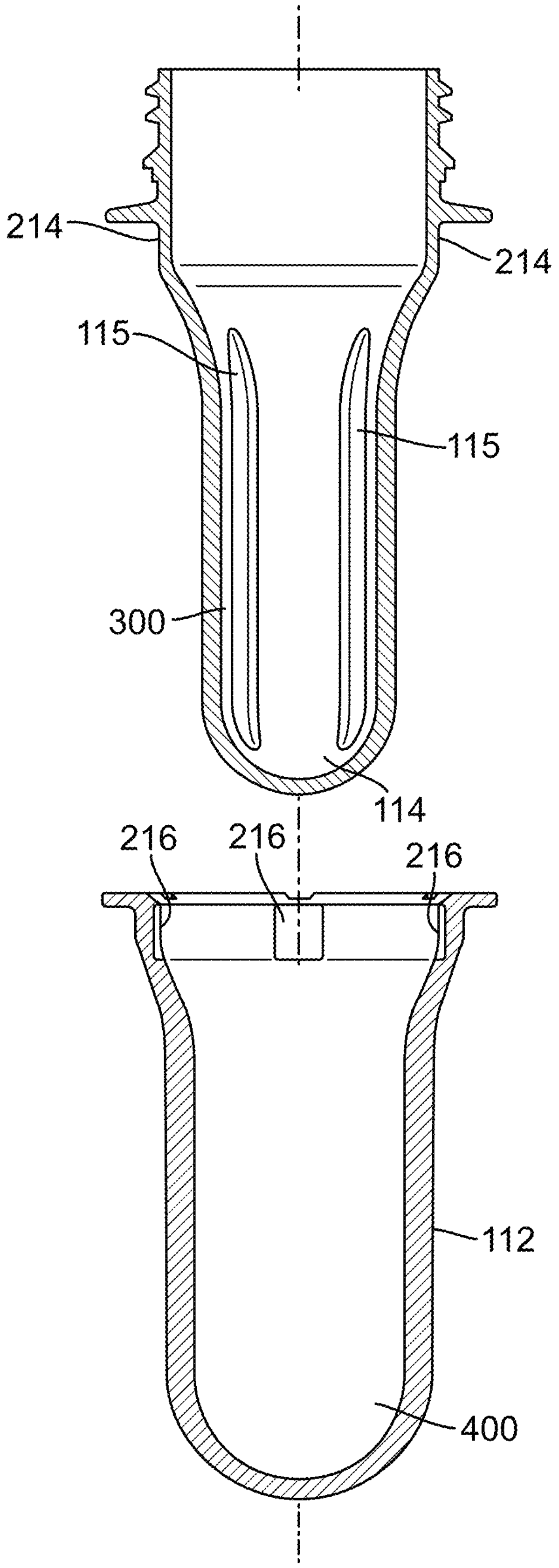
FIG. 9 is a cross-sectional view of preforms for forming a beverage container.

In some embodiments venting openings 210 may be disposed near the top of bottle 100 (e.g., in neck 126). FIG. 9 shows a cross-sectional view of two preforms. An inner preform 300 (corresponding to inner layer 114), and an outer preform 400 (corresponding to outer layer 112). Examples of venting openings 210 are created between inner preform 300 and outer preform 400 in FIG. 9. In some embodiments, inner preform 300 has a venting structure 214 that mates with a venting structure 216 of outer preform 400 to form a vent opening 210 and corresponding vent path 212 when inner preform 300 and outer preform 400 are assembled together (see FIG. 11).

Figure 10A:
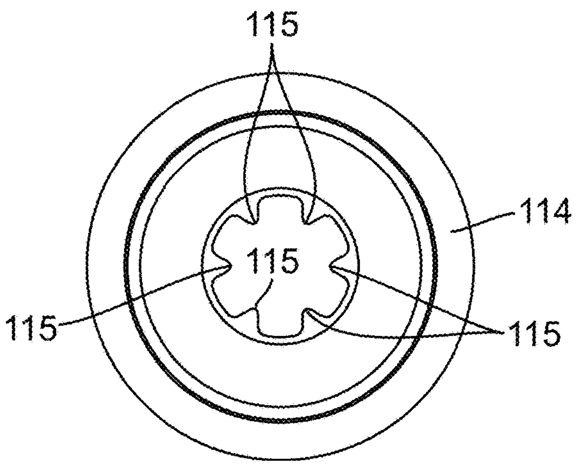
FIG. 10A is a top view of the inner preform of FIG. 9.
Figure 10B:
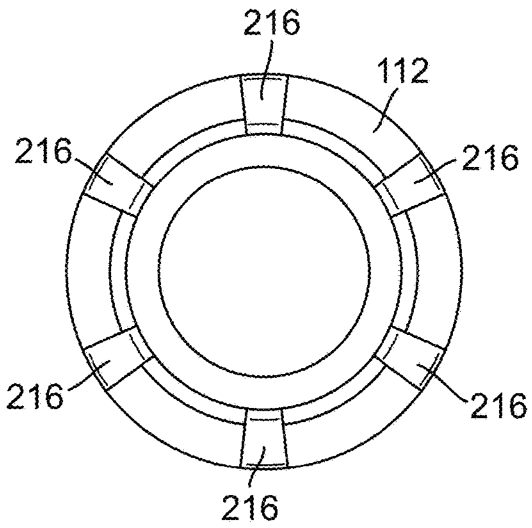
FIG. 10B is a top view of the outer preform of FIG. 9.

Also visible in FIG. 9 are ribs 115 on the interior wall of inner preform 300. FIGS. 10A and 10B are top views of the inner preform 300 and outer preform 400 of FIG. 9, respectively. Venting openings 210 are visible in FIG. 10B. In some embodiments, bottle 100 may be formed from inner preform 300 and outer preform 400 that are radially aligned such that there is at least one venting openings 210 between each pair of ribs 115, such that the space between each pair of ribs 115 is vented through at least one vent opening 210. This can help promote even distribution of space 30 between inner layer 114 and outer layer 112 of finished bottle 100 when subjected to internal vacuum, as discussed above.

Figure 11:
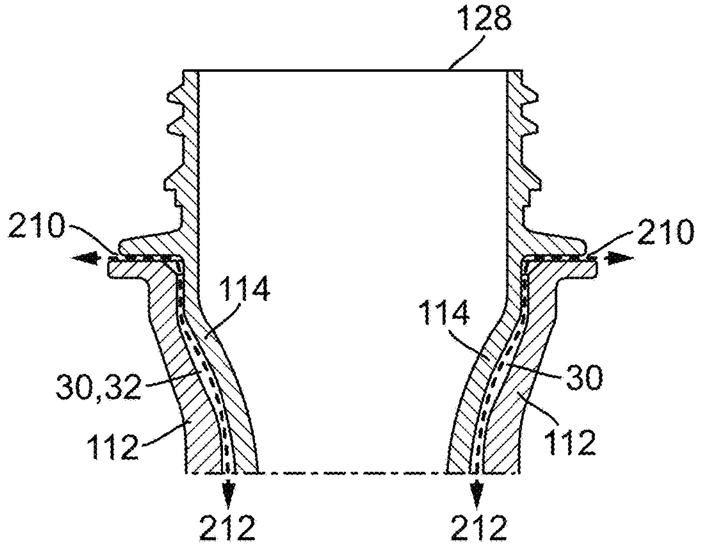
FIG. 11 is a cross-sectional view of the upper portion of the preforms of FIG. 9 after assembly.

For example, as shown in FIGS. 9 and 10A-10B, there may be a single venting opening 210 corresponding to space 30 between each pair of ribs 115. As an example, in an embodiment with an equal number of ribs 115 and venting openings 210 (e.g., six of each, as shown in FIGS. 9 and 10A-10B), outer preform 400 and inner preform 300 may be rotationally aligned about a shared central axis such that each venting opening 210 is disposed between two adjacent ribs 115. The venting path 212 of the embodiments shown in FIGS. 9 and 10A-10B is illustrated in FIG. 11, which is a cross-sectional view of the top portion of the preforms of FIG. 9 once they have been assembled, the cross-section taken through venting openings 210 disposed across from each other about the shared central axis of assembled outer preform 400 and inner preform 300. As is evident, venting path 212 connects rib compartments 32 to ambient atmosphere.

In some embodiments, venting holes may exit outer layer 112 closer to opening 128 (e.g., through a thread, between threads, through a tamper-evident formation, through a flange) such that they are covered by cap 130 when cap 130 is screwed onto bottle 100.

In some embodiments, as shown, for example, in FIG. 12, gas introduction system or mechanism 200 may alternatively or additionally includes a gas generator 220 disposed between layers that are to delaminate. Gas generator 220 is designed to produce gas when a triggering event occurs. For example, the triggering event may be when pressure in space 30 falls below a certain threshold (e.g., due to thermal contraction of beverage 10 as described above). The triggering event may also be a change in temperature (e.g., caused by cooling of beverage 10 as described above). In some embodiments, gas generator 220 may produce gas through a chemical reaction. The base materials for the chemical reaction may be located in space 30, and in some embodiments the materials may be attached to the surface of one of layers 112, 114, 116 (e.g., attached to the inner surface of outer layer 112).

In some embodiments outer layer 112 may be configured to act as gas introduction system 200. For example, outer layer 114 may be configured to allow gas particles to enter and exit space 30 as needed. Outer layer 112 may, for example, be made from a porous material, which can be formed by adding a cavitation additive to the plastic material that outer layer 112 is formed from. In this way, the gas pressure in space 30 can equalize with the ambient gas pressure found outside of outer layer 112.

Embodiments of bottle 100 may be manufactured using several different methods. In a single preform method, the plastic material of outer layer 112, inner layer 114, and any interlayers 116 are simultaneously injected into a preform mold. After the injection of the layers, the resulting preform can be expanded into the desired bottle shape by inserting the preform into a female mold of the proper shape and blowing heated air into the preform. In a multi-stage preform method, at least outer layer 112 and inner layer 114 are manufactured using separate preform molds. Inner layer 114 is then inserted into outer layer 112. Inner layer 114 and outer layer 112 are then fixed to each other by any suitable method, including adhesives or plastic welding.

A method of controlling deformation of a beverage container during cooling of a beverage includes filling bottle 100 with a hot beverage and sealing bottle 100. As the beverage is allowed to cool, the beverage undergoes thermal contraction upon cooling. At least inner layer 114 separates from outer layer 112 such that inner layer 112 moves inward away from an outer layer 114 of the layers of bottle 100 to reduce an internal volume of bottle 100 in response to the thermal contraction of the beverage.

The breadth and scope of the present disclosure should not be limited by any of the above-described exemplary embodiments, but should be defined only in accordance with the claims and their equivalents.

What is claimed is:

1. A bottled beverage, comprising:
- a bottle comprising:
  - a neck;
  - a base;
  - an outer layer;
  - an inner layer disposed inside the outer layer, wherein the inner layer contacts the outer layer at the neck; and
  - a space disposed between the outer layer and the inner layer;
- a beverage sealed within the inner layer;
- wherein the inner layer is biased toward the outer layer,
- wherein the bias of the inner layer resists contraction of the inner layer,
- wherein at least a portion of the inner layer contracts from the outer layer in response to a reduction in volume of the beverage while the beverage is sealed within the inner layer, and
- wherein the inner layer and the outer layer comprise a plastic material.

2. The bottled beverage of claim 1, wherein the inner layer is configured to deform independently of the outer layer, and
- wherein an internal volume of the inner layer is less than an initial internal volume of the inner layer before the beverage is sealed.

3. The bottled beverage of claim 2, wherein the shape of the outer layer does not change in response to the reduction in volume of the beverage.

4. The bottled beverage of claim 1, wherein the outer layer is cylindrical, with no ribs or panels.

5. The bottled beverage of claim 1, wherein the inner layer is configured to move toward the outer layer when a seal sealing the beverage within the inner layer is broken.

6. The bottled beverage of claim 1, wherein the internal volume of the inner layer does not decrease in volume as the beverage is released from the bottle.

7. The bottled beverage of claim 1, wherein the inner layer and the outer layer have corresponding shapes between the neck and the base.

8. The bottled beverage of claim 1, wherein the inner layer is also attached to the outer layer at the base.

9. The bottled beverage of claim 1, further comprising a gas-introduction mechanism in fluid connection with the space between the outer layer and the inner layer.

10. The bottled beverage of claim 9, wherein the gas-introduction mechanism comprises venting openings in the outer layer that allow pressure within the space between the outer layer and the inner layer to equalize with a pressure outside of the outer layer.

11. The bottled beverage of claim 10, wherein the venting openings are disposed in the base.

12. The bottled beverage of claim 11, wherein the venting openings are configured to break open to fluidly connect the space between the outer layer and the inner layer with the pressure outside the outer layer when at a set pressure differential.

13. The bottled beverage of claim 1, wherein the inner layer comprises vertically-oriented ribs formed on an interior surface of the inner layer, wherein the vertically-oriented ribs are configured to promote deformation of the inner layer between the vertically-oriented ribs.

14. The bottled beverage of claim 13, wherein the inner layer comprises at least four of the vertically-oriented ribs, and wherein the vertically-oriented ribs are evenly-spaced around a central longitudinal axis of the bottle.

15. A beverage bottle, comprising:
- a beverage bottle wall formed of layers of plastic,
- wherein, in a body portion of the beverage bottle, an outer surface of the innermost layer has the same shape as an inner surface of an outermost layer of the layers,
- wherein the innermost layer is configured to move away from the outermost layer in the body portion to adapt an internal volume of the beverage bottle to a volume change of a cooling beverage disposed within the inner layer after the beverage bottle is sealed, and
- wherein the innermost layer has ribs formed as thickened sections of the innermost layer, and wherein the ribs of the innermost layer are configured to concentrate the innermost layer's motion away from the outermost layer at portions of the innermost layer between adjacent ribs.

16. The beverage bottle of claim 15, wherein the outermost layer is configured to maintain its shape while the innermost layer moves away from the outermost layer.

17. The beverage bottle of claim 15, wherein a space between the innermost layer and the outermost layer increases when the innermost layer moves away from the outermost layer, and
- wherein the beverage bottle further comprises a gas-introduction mechanism in fluid connection with the space between the outermost layer and the innermost layer, wherein the gas-introduction mechanism is configured to supply gas to the space in response to a change in volume within the innermost layer.

18. The beverage bottle of claim 17, wherein the gas-introduction mechanism comprises venting openings in the beverage bottle wall that allow pressure within the space between the outermost layer and the innermost layer to equalize with a pressure outside of the outermost layer.

19. The beverage bottle of claim 15, wherein the outermost layer comprises a reinforcing band that is a section of greater thickness as compared to the thickness of the rest of the outermost layer, wherein the reinforcing band is formed in the body portion and occupies a constant percentage of the height of the beverage bottle.

* * * * *